(12) United States Patent
Balakrishnan et al.

(10) Patent No.: US 11,742,897 B2
(45) Date of Patent: Aug. 29, 2023

(54) METHOD AND APPARATUS FOR WIRELESS COMMUNICATIONS

(71) Applicant: NXP USA, Inc., Austin, TX (US)

(72) Inventors: Hari Ram Balakrishnan, Chennai (IN); Sudhir Srinivasa, Los Gatos, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/369,923

(22) Filed: Jul. 7, 2021

(65) Prior Publication Data

US 2022/0014238 A1 Jan. 13, 2022

(30) Foreign Application Priority Data

Jul. 8, 2020 (IN) .............................. 202021029066

(51) Int. Cl.
*H04B 7/024* (2017.01)
*H04B 7/0452* (2017.01)
*H04L 5/00* (2006.01)
*H04W 72/04* (2023.01)
*H04W 72/0453* (2023.01)

(52) U.S. Cl.
CPC ........... *H04B 7/024* (2013.01); *H04B 7/0452* (2013.01); *H04L 5/0048* (2013.01); *H04W 72/0453* (2013.01)

(58) Field of Classification Search
CPC ... H04L 27/2602; H04L 5/0035; H04L 5/009; H04L 25/0204; H04L 5/0007; H04L 5/0032; H04L 5/0048; H04W 72/0453; H04B 7/024

See application file for complete search history.

(56) References Cited

U.S. PATENT DOCUMENTS

| | | | |
|---|---|---|---|
| 10,797,805 B1* | 10/2020 | Mirfakhraei | G06N 3/0454 |
| 10,805,892 B2 | 10/2020 | Ram et al. | |
| 2014/0169488 A1* | 6/2014 | Varanese | H04L 27/2613 375/295 |
| 2014/0177753 A1* | 6/2014 | Wang | H04B 1/0475 375/296 |
| 2016/0226696 A1* | 8/2016 | Zhang | H04L 27/2675 |
| 2017/0164387 A1* | 6/2017 | Lou | H04W 72/1252 |
| 2017/0324602 A1* | 11/2017 | Jos | H04L 27/2657 |

(Continued)

OTHER PUBLICATIONS

Porat, Ron et al. "Joint Processing MU-MIMO Simulations", Dec. 12, 2018, 17 pgs.

*Primary Examiner* — Aristocratis Fotakis

(57) ABSTRACT

Embodiments of a method and an apparatus for wireless communications are disclosed. In an embodiment, a method for wireless communications involves assigning subcarriers of a first access point (AP) and a second AP to a subcarrier set of a virtual AP, generating, by the virtual AP, a packet that includes a signal for a station (STA) and that is transmitted using the subcarrier set, where generating the packet includes: encoding a preamble portion of the packet on the assigned subcarriers included in the subcarrier set, nulling the preamble portion of the packet for unassigned subcarriers of the first AP and the second AP, encoding a subsequent portion of the packet according to a Distributed Multiple-Input Multiple-Output (DMIMO) transmission, and transmitting the packet to the STA.

22 Claims, 6 Drawing Sheets

(56) References Cited

U.S. PATENT DOCUMENTS

| | | | |
|---|---|---|---|
| 2018/0014216 A1* | 1/2018 | Banerjea | H04L 27/2602 |
| 2019/0068426 A1* | 2/2019 | Chakraborty | H04B 7/024 |
| 2019/0373569 A1* | 12/2019 | Ram | H04W 56/005 |
| 2020/0037275 A1* | 1/2020 | Liu | H04L 5/0048 |
| 2021/0022178 A1* | 1/2021 | Verma | H04L 5/0055 |
| 2021/0036744 A1 | 2/2021 | Balakrishnan et al. | |
| 2021/0127291 A1* | 4/2021 | Chen | H04L 5/0053 |
| 2021/0409075 A1* | 12/2021 | Yang | H04W 74/002 |

* cited by examiner

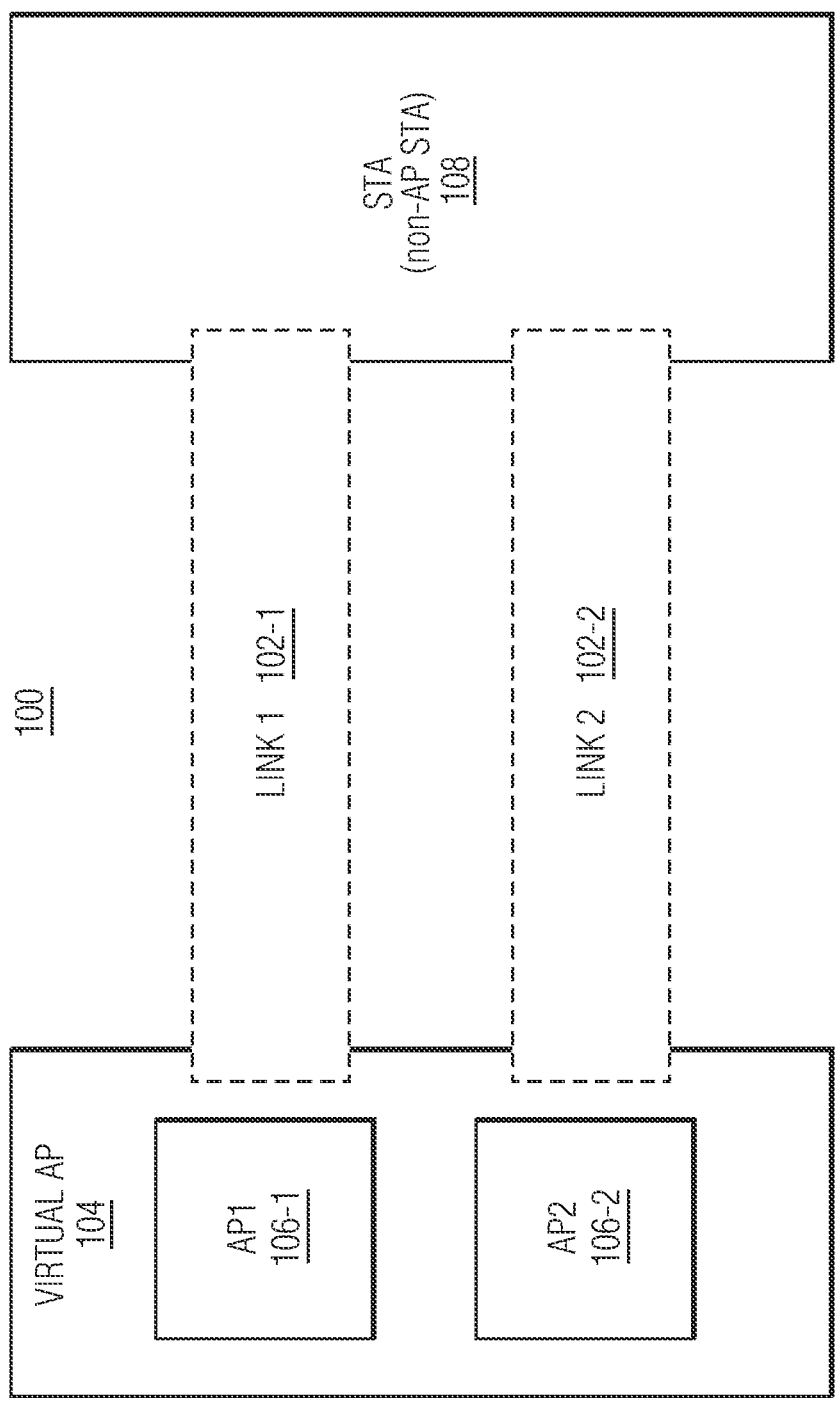

METHOD AND APPARATUS FOR WIRELESS COMMUNICATIONS

CROSS-REFERENCE TO RELATED APPLICATIONS

This application is entitled to the benefit of India Provisional Patent Application Serial Number 202021029066, filed on Jul. 8, 2020, which is incorporated by reference herein.

BACKGROUND

In wireless communications, wireless transmitters/receivers, e.g., access points (APs) or stations (STAs), can execute various wireless operations, such as transmission and reception of frames via one or more communication links. As an example, multiple APs may coordinate and transmit packets to one or more STAs via a Distributed Multiple-Input Multiple-Output (DMIMO) transmission. In such an example, DMIMO transmissions may use synchronization techniques, e.g., Carrier Frequency Offset (CFO) synchronization, timing synchronization, and/or phase synchronization to coordinate the transmission of packets from multiple APs. However, because DMIMO transmissions may experience synchronization difficulties due to residual CFO build up over time, wireless communications may not be performed efficiently.

SUMMARY

Embodiments of a method and an apparatus for wireless communications are disclosed. In an embodiment, a method for wireless communications involves assigning subcarriers of a first access point (AP) and a second AP to a subcarrier set of a virtual AP, generating, by the virtual AP, a packet that includes a signal for a station (STA) and that is transmitted using the subcarrier set, where generating the packet includes: encoding a preamble portion of the packet on the assigned subcarriers included in the subcarrier set, nulling the preamble portion of the packet for unassigned subcarriers of the first AP and the second AP, encoding a subsequent portion of the packet according to a Distributed Multiple-Input Multiple-Output (DMIMO) transmission, and transmitting the packet to the STA.

In an embodiment, the subcarrier set avoids signal overlap between the assigned subcarriers of the first AP and the second AP.

In an embodiment, the assigned subcarriers included in the subcarrier set are even subcarriers for the first AP and odd subcarriers of the second AP.

In an embodiment, the assigned subcarriers included in the subcarrier set are odd subcarriers of the first AP and even subcarriers of the second AP.

In an embodiment, the assigned subcarriers included in the subcarrier set are a first half of subcarriers included in each 20 MHz band for the first AP and a second half of subcarriers included in each 20 MHz band for the second AP.

In an embodiment, the assigned subcarriers included in the subcarrier set are a second half of subcarriers included in each 20 MHz band for the first AP and a first half of subcarriers included in each 20 MHz band for the second AP.

In an embodiment, the assigned subcarriers included in the subcarrier set are subcarriers included in a 20 MHz band and alternate between the first AP and the second AP with each 20 MHz band.

In an embodiment, the STA uses the signal transmitted using the subcarrier set to estimate Carrier Frequency Offset (CFO) from the first AP and the second AP independently.

In an embodiment, the STA estimates the CFO from the first AP and the second AP by splitting a fast Fourier transform (FFT) of a Legacy Long Training Field-1 (L-LTF1) field and an FFT of a Legacy Long Training Field-2 (L-LTF2) field into two groups for the first AP and the second AP, where the L-LTF1 field and the L-LTF2 field are both included in a Legacy Long Training Field (L-LTF) field, and where a first group is represented by L-LTF1_APi and a second group is represented by L-LTF2_APi, and where APi represents at least one of the first AP and the second AP, calculating the CFO of APi from the L-LTF field ($\Delta f_{L-LTF}$(APi)):

$$\left(\Delta f_{L-LTF}(APi)\right) = \sum_{k \in APi\, tones} \frac{\angle\left(L-LTF1\_APi(k)' \times L-LTF2\_APi(k)\right)}{2\pi N},$$

where $\angle(x)$ represents an angle of x in radians, x' represents a conjugate of x, N represents an FFT size, and k represents the subcarrier set of APi.

In an embodiment, the STA estimates the CFO from the first AP and the second AP by splitting an FFT of a Legacy Signal (L-SIG) field and an FFT of a Repeated Legacy Signal (RL-SIG) field into two groups for the first AP and the second AP, where a first group is represented by L-SIG_APi and a second group is represented by RL-SIG_APi, and where APi represents at least one of the first AP and the second AP, calculating the CFO of APi from the L-SIG field ($\Delta f_{L-SIG}$(APi)):

$$\left(\Delta f_{L-SIG}(APi)\right) = \sum_{k \in APi\, tones} \frac{\angle\left(L-SIG\_APi(k)' \times RL-SIG\_APi(k)\right)}{2\pi N * 1.25},$$

where $\angle(x)$ represents an angle of x in radians, x' represents a conjugate of x, N represents an FFT size, and k represents the subcarrier set of APi.

In an embodiment, the STA estimates the CFO from the first AP and the second AP by splitting an FFT of an L-LTF1 field and an FFT of an L-LTF2 field into two groups for the first AP and the second AP, where the L-LTF1 field and the L-LTF2 field are both included in a L-LTF field, and where a first group is represented by L-LTF1_APi and a second group is represented by L-LTF2_APi, and where APi represents at least one of the first AP and the second AP, calculating an L-LTF CFO of APi ($\Delta f_{L-LTF}$(APi)):

$$\left(\Delta f_{L-LTF}(APi)\right) = \sum_{k \in APi\, tones} \frac{\angle\left(L-LTF1\_APi(k)' \times L-LTF2\_APi(k)\right)}{2\pi N},$$

where $\angle(x)$ represents an angle of x in radians, x' represents a conjugate of x, N represents an FFT size, and k represents the subcarrier set of APi, splitting an FFT of L-SIG and an FFT of RL-SIG into two groups for the first AP and the second AP, where a first group is represented by L-SIG_APi and a second group is represented by RL-SIG_APi, and where APi represents at least one of the first AP and the second AP, calculating an L-SIG CFO of APi ($\Delta f_{L\text{-}SIG}(APi)$):

$$(\Delta f_{L\text{-}SIG}(APi)) = \sum_{k \in APi\,tones} \frac{\angle(L\text{-}SIG\_APi(k)' \times RL\text{-}SIG\_APi(k))}{2\pi N * 1.25},$$

where $\angle(x)$ represents an angle of x in radians, x' represents a conjugate of x, N represents an FFT size, and k represents the subcarrier set of APi, and calculating the CFO ($\Delta f$):

$$\Delta f = g(\Delta f_{L\text{-}STF} + \Delta f_{L\text{-}LTF}(APi), \Delta f_{hd\ L\text{-}STF} + \Delta f_{L\text{-}LTF} + \Delta f_{L\text{-}SIG}(APi)),$$

where g represents at least one of an average and a function to estimate a single value.

In an embodiment, the STA transmits the estimated CFO to the first AP and the second AP via a control packet.

In an embodiment, the first AP and the second AP receive the control packet that includes the estimated CFO and use a prediction algorithm to estimate a subsequent CFO for a subsequent packet.

In an embodiment, the subsequent CFO is corrected based on a predicted CFO value by the first AP and the second AP.

In an embodiment, the first AP and the second AP transmit the subsequent packet using the subsequent CFO.

In an embodiment, the prediction algorithm is based on at least one of a least square model, a linear model, a logistic regression, decision tree learning, and machine learning.

In an embodiment, the prediction algorithm is a simple linear model according to:

$$cfo(n) = \sum_{i=1}^{l} cfo(n-i) \times \alpha_i + cfo_{fb}(n-1) \times \beta$$

where, cfo(n) is used by at least one of the first AP and the second AP for an $n^{th}$ packet starting from an initial packet, $cfo_{fb}(n-1)$ is a CFO estimate from the STA, and $\alpha_i$'s and $\beta$ are a co-efficient used.

In an embodiment, nulling the preamble portion of the packet includes encoding zeros for the unassigned subcarriers.

In an embodiment, transmitting the packet to the STA avoids usage of a trigger frame before each down-link (DL) packet transmitted in accordance with the DMIMO transmission.

An embodiment of a virtual AP is also disclosed. The virtual AP includes a processor configured to assign subcarriers of a first AP and a second AP to a subcarrier set of the virtual AP, generate a packet that includes a signal for an STA and that is transmitted using the subcarrier set, where generation of the packet includes: encoding a preamble portion of the packet on the assigned subcarriers included in the subcarrier set, nulling the preamble portion of the packet for unassigned subcarriers of the first AP and the second AP, encoding a subsequent portion of the packet according to a DMIMO transmission, and transmit the packet to the STA.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 1 depicts a wireless communications system.

Throughout the description, similar reference numbers may be used to identify similar elements.

DETAILED DESCRIPTION

Figure 2A:
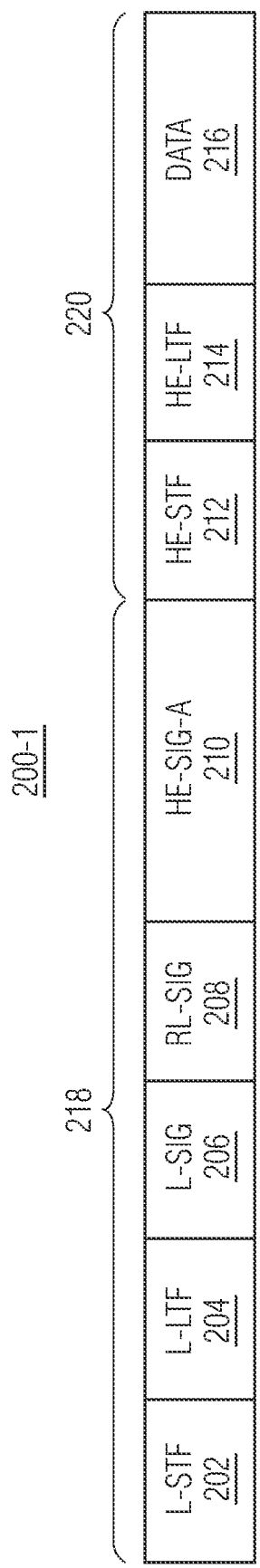
FIG. 2A depicts an example of a packet that may be generated and transmitted in accordance with an embodiment of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

In embodiments of a wireless communications system, a wireless transmitter, e.g., an access point (AP) of a wireless local area network (WLAN) may transmit data to at least one associated wireless receiver, e.g., a station (STA) or a non-AP STA. The AP may be configured to operate with the associated STA according to a communication protocol. For example, the communication protocol may be an Extremely High Throughput (EHT) communication protocol, or Institute of Electrical and Electronics Engineers (IEEE) 802.11be communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a Basic Service Set (BSS) with the AP but are generally affiliated with lower data throughput protocols. The lower data throughput communication protocols (e.g., High Efficiency (HE) communication protocol, Very High Throughput (VHT) communication protocol, etc.) may be collectively referred to herein as "legacy" communication protocols.

FIG. 1 depicts a wireless communications system 100 that is used for wireless (e.g., WiFi) communications. In the embodiment depicted in FIG. 1, the wireless communications system includes one virtual AP, which is implemented as virtual AP 104, and one non-AP STA, which is implemented as STA 108. The wireless communications system can be used in various applications, such as industrial applications, medical applications, computer applications, and/or consumer or enterprise applications. In some embodiments, the wireless communications system may be a multi-link communications system, such as a multi-link communications system compatible with an IEEE 802.11 protocol. For example, the wireless communications system may be a multi-link communications system compatible with the IEEE 802.11 be protocol. Although the depicted wireless communications system 100 is shown in FIG. 1 with certain components and described with certain functionality herein, other embodiments of the wireless communications system may include fewer or more components to implement the same, less, or more functionality. For example, in some embodiments, the wireless communications system includes a single virtual AP with multiple STAs, or multiple virtual APs with more than one STA. In another example, although the wireless communications system is shown in FIG. 1 as being connected in a certain topology, the network topology of the wireless communications system is not limited to the topology shown in FIG. 1.

In the embodiment depicted in FIG. 1, the virtual AP 104 includes two radios, implemented as APs 106-1 and 106-2. In such an embodiment, the APs may be AP1 106-1 and AP2 106-2. In some embodiments, the APs 106-1 and 106-2 may be part of an AP multi-link device (MLD). In some embodiments, the virtual AP 104 implements upper layer Media Access Control (MAC) functionalities (e.g., beacon acknowledgement establishment, reordering of frames, etc.) and the APs 106-1 and 106-2 implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 are wireless APs compatible with at least one WLAN communications protocol (e.g., at least one IEEE 802.11 protocol). For example, the APs 106-1 and 106-2 may be wireless APs compatible with the IEEE 802.11 be protocol.

In some embodiments, an AP (e.g., AP1 106-1 and/or AP2 106-2) wirelessly connects to wireless STAs, for example, through one or more WLAN communications protocols, such as the IEEE 802.11 protocol. In some embodiments, an AP (e.g., AP1 106-1 and/or AP2 106-2) includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the virtual AP 104 may operate in a different size BSS operating channel. For example, AP1 106-1 may operate in a 320 MHz BSS operating channel and AP2 106-2 may operate in a 160 MHz BSS operating channel. Although the virtual AP 104 is shown in FIG. 1 as including two APs, other embodiments of the virtual AP 104 may include more than two APs.

In the embodiment depicted in FIG. 1, the non-AP STA, implemented as STA 108, includes a radio, and may be implemented in hardware (e.g., circuits), software, firmware, or a combination thereof. The STA 108 may be fully or partially implemented as an IC device. In some embodiments, the STA 108 may be part of an STA MLD, such that the STA may be a communications device that wirelessly connects to wireless APs. For example, the STA 108 may be implemented in a laptop, a desktop personal computer (PC), a mobile phone, or other communications device that supports at least one WLAN communications protocol. In some embodiments, the STA 108 may be a communications device compatible with at least one IEEE 802.11 protocol (e.g., the IEEE 802.11 be protocol). In some embodiments, the STA 108 includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1, the STA 108 communicates with the virtual AP 104 via two communication links, e.g., link1 102-1 and link2 102-2. For example, each of the APs 106-1 or 106-2 communicates with the STA 108 via corresponding communication links 102-1 or 102-2. In an embodiment, a communication link (e.g., link1 102-1 or link2 102-2) may include a BSS operating channel established by an AP (e.g., AP1 106-1 or AP2 106-2) that features multiple 20 MHz channels used to transmit frames (e.g., Physical Layer Protocol Data Units (PPDUs), beacons, management frames, etc.) between a wireless transmitter (e.g., an AP or a virtual AP) and a wireless receiver (e.g., an STA). In some embodiments, a 20 MHz channel may be a punctured 20 MHz channel or an unpunctured 20 MHz channel In some embodiments, each link (e.g., link1 102-1 and/or link2 102-2) may include subcarriers on which packets may be transmitted between the APs 106-1 and/or 106-2 and the STA 108. Although the virtual AP 104 is shown in FIG. 1 as communicating with one STA (e.g., STA 108), other embodiments may involve the virtual AP 104 communicating with more than one STA. In addition, although the virtual AP 104 communicates (e.g., wirelessly communicates) with the STA 108 via multiple links 102-1 and 102-2, in other embodiments, the virtual AP 104 may communicate (e.g., wirelessly communicate) with the STA 108 via more than two communication links.

In some embodiments, the wireless communications system 100 may communicate via a Distributed Multiple-Input Multiple-Output (DMIMO) transmission technique where multiple APs (e.g., AP1 106-1 and AP2 106-2) coordinate and transmit packets to at least one client (e.g., STA 108). Typically, the DMIMO transmission technique may need accurate synchronization techniques, e.g., Carrier Frequency Offset (CFO) synchronization, timing synchronization, and/or phase synchronization to support coordinated packet transmissions. However, such synchronization techniques may be inefficient as synchronization may be lost to residual CFO build up. For example, in some embodiments, even if an initial CFO synchronization may be accurate, residual CFO may build up over time which may result in a loss of precoder gain as packet length increases. In such an example, build up may be due to residual CFO and/or CFO drift (e.g., AP CFO drift and/or STA CFO drift). Additionally, in such an example, CFO build up may not be corrected as the CFO build up from multiple APs may be more difficult to fix. Thus, reducing the residual CFO build up may help improve synchronization techniques for wireless communications systems communicating via DMIMO transmissions.

In accordance with an embodiment of the invention, a technique for wireless communications involves assigning subcarriers of a first AP and a second AP to a subcarrier set of a virtual AP, generating, by the virtual AP, a packet that includes a signal for an STA and that is transmitted using the subcarrier set, wherein generating the packet includes, encoding a preamble portion of the packet on the assigned subcarriers included in the subcarrier set, nulling the preamble portion of the packet for unassigned subcarriers of the first AP and the second AP, encoding a subsequent portion of the packet according to a DMIMO transmission, and transmitting the packet to the STA. In an embodiment, the subcarrier set may avoid signal overlap between the assigned subcarriers of the first AP and the second AP. In some embodiments, the STA may use the signal transmitted using the subcarrier set to estimate CFO from the first AP and the second AP independently. By generating and transmitting a packet with a signal using a subcarrier set that includes subcarriers from multiple APs, the STA may perform independent channel estimates using the estimated CFO from each AP. Thus, the ability to perform independent channel estimates may help reduce residual CFO build up and further improve synchronization techniques for wireless communications systems communicating via DMIMO transmissions.

Examples of packets that that may be generated and transmitted by a virtual AP are described in further detail with reference to FIGS. 2A-2B and FIG. 3.

FIG. 2A depicts an example of a packet, 200-1, that may be generated and transmitted in accordance with an embodiment of the invention. In an embodiment, the packet 200-1 may have an HE packet format (e.g., an HE single-user (SU) (HE-SU) packet format), such that the packet 200-1 may be in accordance with the HE communication protocol. In some embodiments, the packet 200-1 that may have the HE-SU packet format may be generated by a virtual AP (e.g., virtual AP 104) and transmitted to an STA (e.g., STA 108).

With reference to FIG. 2A, the packet 200-1 that may have the HE-SU packet format is shown as including eight fields, implemented as a first field, Legacy Short Training Field (L-STF) field 202, a second field, Legacy Long Training Field (L-LTF) field 204, a third field, Legacy Signal (L-SIG) field 206, a fourth field, Repeated Legacy Signal (RL-SIG) field 208, a fifth field, HE Signal-A (HE-SIG-A) field 210, a sixth field, HE Short Training Field (HE-STF) field 212, a seventh field, HE Long Training Field (HE-LTF) field 214, and an eighth field, Data 216. In an embodiment, the packet 200-1 may include a preamble portion 218 and a subsequent portion 220. In such an embodiment, the preamble portion 218 may include the L-STF field 202, the L-LTF field 204, the L-SIG field 206, the RL-SIG field 208, and the HE-SIG-A field 210. In an embodiment, the subsequent portion 220 may include the HE-STF field 212, the HE-LTF field 214, and the Data 216. In some embodiments, the L-LTF field 204 may include a Legacy Long Training Field-1 (L-LTF1) field and a Legacy Long Training Field-2 (L-LTF2) field (not shown).

Figure 2B:
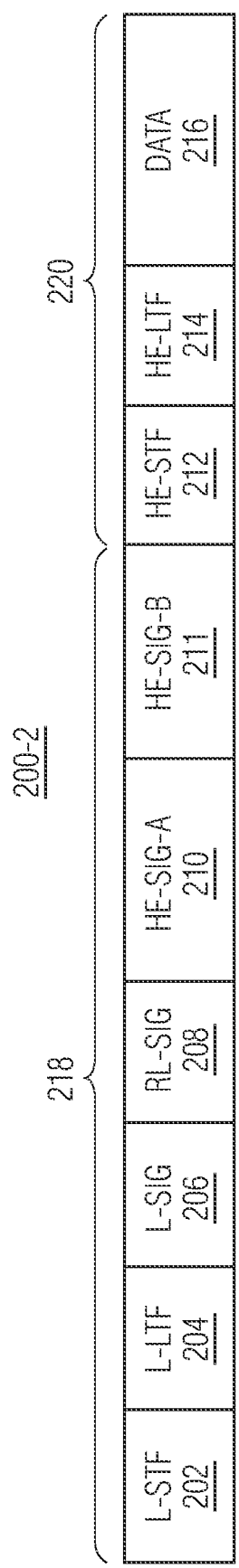
FIG. 2B depicts another example of a packet that may be generated and transmitted in accordance with an embodiment of the invention.

FIG. 2B depicts another example of a packet, 200-2, that may be generated and transmitted in accordance with an embodiment of the invention. In an embodiment, the packet 200-2 may have an HE packet format (e.g., an HE multi-user (MU) (HE-MU) packet format), such that the packet 200-2 may be in accordance with the HE communication protocol. In some embodiments, the HE-MU packet format may be an HE-MU Orthogonal-Frequency Division Multiple Access (OFDMA) (HE-MU OFDMA) packet format or an HE-MU non-OFDMA packet format. In some embodiments, the packet 200-2 that may have the HE-MU packet format may be generated by a virtual AP (e.g., virtual AP 104) and transmitted to multiple STAs.

With reference to FIG. 2B, the packet 200-2 that may have the HE-MU packet format is shown as including nine fields, implemented as a first field, L-STF field 202, a second field, L-LTF field 204, a third field, L-SIG field 206, a fourth field, RL-SIG field 208, a fifth field, HE-SIG-A field 210, a sixth field, HE Signal-B (HE-SIG-B) field 211, a seventh field, HE-STF field 212, an eighth field, HE-LTF field 214, and a ninth field, Data 216. In an embodiment, the packet 200-2 may include a preamble portion 218 and a subsequent portion 220. In such an embodiment, the preamble portion 218 may include the L-STF field 202, the L-LTF field 204, the L-SIG field 206, the RL-SIG field 208, the HE-SIG-A field 210, and the HE-SIG-B field 211. In an embodiment, the subsequent portion 220 may include the HE-STF field 212, the HE-LTF field 214, and the Data 216. In some embodiments, the L-LTF field 204 may include an L-LTF1 field and an L-LTF2 field (not shown).

Figure 3:
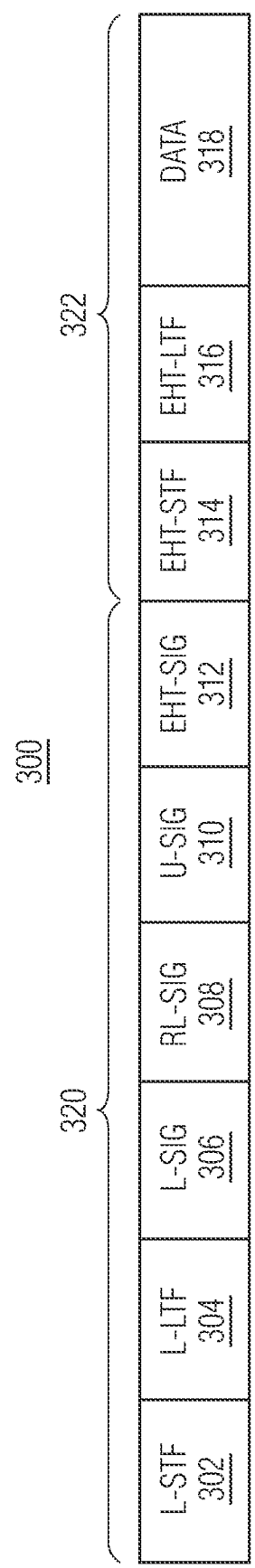
FIG. 3 depicts another example of a packet that may be generated and transmitted in accordance with an embodiment of the invention.

FIG. 3 depicts another example of a packet, 300, that may be generated and transmitted in accordance with an embodiment of the invention. In an embodiment, the packet 300 may have an EHT packet format (e.g., an EHT-SU packet format or an EHT-MU packet format), such that the packet 300 may be in accordance with the EHT communication protocol. In some embodiments, the EHT packet format may be an EHT-MU OFDMA packet format or an EHT-MU non-OFDMA packet format. In an embodiment, the packet 300 that may have the EHT-SU packet format may be generated by a virtual AP (e.g., virtual AP 104) and transmitted to an STA (e.g., STA 108). In another embodiment, the packet 300 that may have the EHT-MU packet format may be generated by a virtual AP (e.g., virtual AP 104) and transmitted to multiple STAs.

With reference to FIG. 3, the packet 300 is shown as including nine fields, implemented as a first field, L-STF field 302, a second field, L-LTF field 304, a third field, L-SIG field 306, a fourth field, RL-SIG field 308, a fifth field, Universal Signal (U-SIG) field 310, a sixth field, EHT Signal (EHT-SIG) field 312, a seventh field, EHT Short Training Field (EHT-STF) field 314, an eighth field, EHT Long Training Field (EHT-LTF) field 316, and a ninth field, Data 318. In an embodiment, the packet 300 may include a preamble portion 320 and a subsequent portion 322. In such an embodiment, the preamble portion 320 may include the L-STF field 302, the L-LTF field 304, the L-SIG field 306, the RL-SIG field 308, the U-SIG field 310, and the EHT-SIG field 312. In an embodiment, the subsequent portion 322 may include the EHT-STF field 314, the EHT-LTF field 316, and the Data 318. In some embodiments, the L-LTF field 304 may include an L-LTF1 field and an L-LTF2 field (not shown).

A functional block diagram that depicts generating and transmitting a packet in accordance with an embodiment of the invention is described in further detail with reference to FIG. 4.

Figure 4:
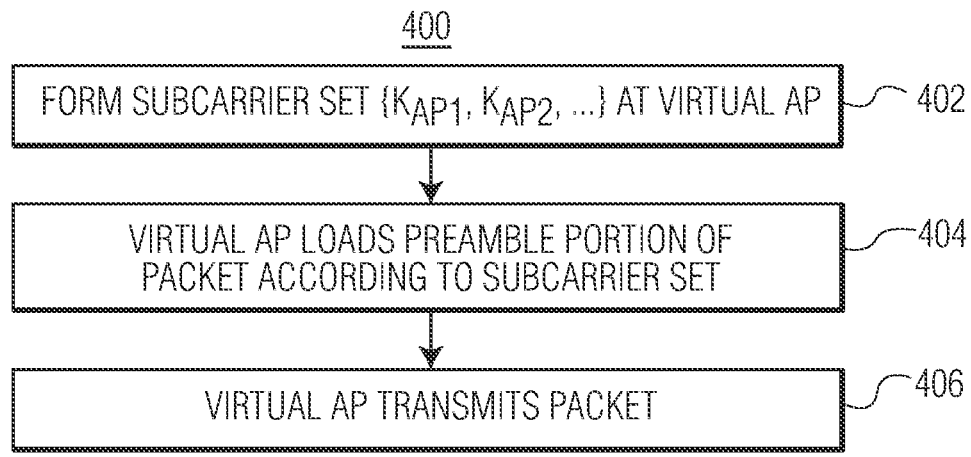
FIG. 4 depicts a functional block diagram of a technique for generating and transmitting a packet at a virtual access point (AP) in accordance with an embodiment of the invention.

FIG. 4 depicts a functional block diagram, 400, of a technique for generating and transmitting a packet at a virtual AP (e.g., virtual AP 104) in accordance with an embodiment of the invention. At block 402, a subcarrier set, e.g., $\{K_{AP1}, K_{AP2}, \ldots\}$ may be formed at the virtual AP, such that the subcarrier set includes assigned subcarriers from multiple APs (e.g., AP1 106-1 and AP2 106-2). In some embodiments, the subcarrier set formed at the virtual AP may be pre-defined and/or fixed. At block 404, the virtual AP may load a preamble portion of a packet according to the subcarrier set. In some embodiments, the preamble portion may be preamble portion 218 or preamble portion 320. In some embodiments, the virtual AP may null the preamble portion of the packet for unassigned subcarriers of multiple APs (e.g., AP1 106-1 and AP2 106-2). As an example, unassigned subcarriers may include subcarriers which may not have been assigned to the subcarrier set of the virtual AP. In some embodiments, a subsequent portion of the packet (e.g., subsequent portion 220 or subsequent portion 322) may then be encoded by the virtual AP according to a DMIMO transmission prior to transmission of the packet. At block 406, the virtual AP may transmit the packet to an STA.

In some embodiments, subcarriers of a first AP (e.g., AP1 106-1) and a second AP (e.g., AP2 106-2) may be assigned to a subcarrier set of a virtual AP, such that the subcarrier set avoids signal overlap between the assigned subcarriers of the first AP and the second AP. For example, there may be no overlap of signals from either AP in a given subcarrier. In an embodiment, subcarriers may be divided into odd subcarriers and even subcarriers, such that the assigned subcarriers included in the subcarrier set may be even subcarriers for the first AP (or second AP) and odd subcarriers for the second AP (or first AP), such that even subcarriers may be unassigned for the second AP (or first AP) and the odd subcarriers may be unassigned for the first AP (or second AP). For example, consider $\{k1, k2, k3, k4, \ldots\}$ as a subcarrier index for the subcarriers of each AP. In such an example, the first AP may be assigned odd subcarriers (e.g., $\{k1, k3, \ldots\}$) and the second AP may be assigned even subcarriers (e.g., $\{k2, k4, \ldots\}$).

In some embodiments, subcarriers may be divided into a first half of subcarriers included in a 20 MHz band and a second half of subcarriers included in the 20 MHz band, such that subcarriers of additional 20 MHz bands may divided similarly (i.e., for each 20 MHz band). As an example, a 20 MHz band may include 64 subcarriers. In such an example, a first AP (or second AP) may be assigned the first 32 subcarriers and a second AP (or first AP) may be assigned the last 32 subcarriers, such that the first 32 subcarriers may be unassigned for the second AP (or first AP) and the last 32 subcarriers may be unassigned for the first AP (or second AP).

In some embodiments, subcarriers may be divided into subcarriers included in a 20 MHz band and may alternate between the first AP and the second AP with each 20 MHz band, such that subcarriers of additional 20 MHz bands may divided similarly (i.e., for each 20 MHz band). As an example, a 40 MHz band may include two 20 MHz bands with 64 subcarriers each. In such an example, a first AP (or second AP) may be assigned the 64 subcarriers of a first 20 MHz band and a second AP (or first AP) may be assigned the 64 subcarriers of a second 20 MHz band, such that the 64 subcarriers of the first 20 MHz band may be unassigned for the second AP (or first AP) and the 64 subcarriers of the second 20 MHz band may be unassigned for the first AP (or second AP). In such an embodiment, alternating the assigned subcarriers of each 20 MHz band may be followed similarly for bands greater than 40 MHz (e.g., 80 MHz, 160 MHz, 320 MHz, etc.).

In an embodiment, a virtual AP (e.g., virtual AP 104) may generate a packet that includes a signal for an STA (or multiple STAs) and that may be transmitted using the subcarrier set. In such an embodiment, a signal may be generated for each of the AP's subcarriers, such that the signal may be loaded on the assigned subcarriers of each AP. For example, consider $\{m1, m2, m3, m4, \ldots\}$ as the signal generated and which may be loaded on assigned subcarriers $\{k1, k2, k3, k4, \ldots\}$ of each AP. In such an example, the first AP may load odd signals $\{m1, m3, \ldots\}$ on assigned odd subcarriers $\{k1, k3, \ldots\}$ and the second AP may load even signals $\{m2, m4, \ldots\}$ on assigned even subcarriers $\{k2, k4, \ldots\}$.

In addition, in such an embodiment, the virtual AP may encode a preamble portion (e.g., preamble portion 218 or preamble portion 320) of a packet (e.g., packet 200-1, packet 200-2, or packet 300) on the assigned subcarriers included in the subcarrier set. In such an example, the virtual AP may null the preamble portion of the packet for unassigned subcarriers of the first AP and the second AP, such that nulling the preamble portion may imply encoding zeros for the unassigned subcarriers. As an example, unassigned subcarriers may be subcarriers of multiple APs (e.g., AP1 106-1 and AP2 106-2) which may not have been assigned to the subcarrier set of the virtual AP. In addition, in such an example, the virtual AP may then encode a subsequent portion (e.g., subsequent portion 220 or subsequent portion 322) of the packet according to a DMIMO transmission and transmit the packet to the STA (or multiple STAs).

In some embodiments, the STA may choose not to process the packet for an independent AP transmission. However, in such an embodiment, there may be no change in transmission and/or processing technique because the STA may still be able to process the preamble portion of the packet with the assigned subcarriers from each AP. For example, since the CFO may be pre-compensated base on an initial trigger packet, a Common Phase Error (CPE) and a CFO estimation error may be minimal, and the preamble may be a Modulation and Coding Scheme-0 (MCSO) transmission.

In some embodiments, the STA may use the signal transmitted by the virtual AP using the subcarrier set to estimate CFO from the first AP and the second AP independently, such that independent CFO estimation may be based on the assigned subcarriers of the preamble portion of the packet.

In an embodiment, the STA may estimate the CFO from the first AP and the second AP by splitting a fast Fourier transform (FFT) of an L-LTF1 field and an FFT of L-LTF2 into two groups for the first AP and the second AP, such that the L-LTF1 field and the L-LTF2 field may be included in an L-LTF field (e.g., L-LTF field 204 or L-LTF field 304). In such an embodiment, a first group may be represented by L-LTF1_APi and a second group may be represented by L-LTF2_APi, such that APi represents the first AP or the second AP. As an example, the STA may calculate the CFO of APi from the L-LTF field ($\Delta f_{LTF}$(APi)):

$$(\Delta f_{L-LTF}(APi)) = \sum_{k \in APi \, tones} \frac{\angle \left( \begin{array}{c} L\text{-LTF1\_APi}(k)' \times \\ L\text{-LTF2\_APi}(k) \end{array} \right)}{2\pi N}, \quad (1)$$

where $\angle$(x) represents an angle of x in radians, x' represents a conjugate of x, N represents an FFT size, and k represents the subcarrier set of APi.

In an embodiment, the STA may estimate the CFO from the first AP and the second AP by splitting an FFT of an L-SIG field (e.g., L-SIG field 206 or L-SIG field 306) and an FFT of an RL-SIG field (e.g., RL-SIG field 208 or RL-SIG field 308) into two groups for the first AP and the second AP. In such an embodiment, a first group may be represented by L-SIG_APi and a second group may be represented by RL-SIG_APi, such that APi represents the first AP or the second AP. As an example, the STA may calculate the CFO of APi from the L-SIG field ($\Delta f_{L\text{-}SIG}$(APi)):

$$(\Delta f_{L\text{-}SIG}(APi)) = \sum_{k \in APi \, tones} \frac{\angle(L\text{-}SIG\_APi(k)' \times RL\text{-}SIG\_APi(k))}{2\pi N * 1.25}, \quad (2)$$

where $\Delta$(x) represents an angle of x in radians, x' represents a conjugate of x, N represents an FFT size, and k represents the subcarrier set of APi.

In an embodiment, the STA may estimate the CFO from the first AP and the second AP by splitting an FFT of an L-LTF1 field and an FFT of an L-LTF2 field into two groups for the first AP and the second AP, such that the L-LTF1 field and the L-LTF2 field may be included in an L-LTF field (e.g., L-LTF field 204 or L-LTF field 304). In such an embodiment, a first group may be represented by L-LTF1_APi and a second group may be represented by L-LTF2_APi, such that APi represents the first AP or the second AP. As an example, the STA may first calculate an L-LTF CFO of APi ($\Delta f_{L-LTF}$(APi)) according to (1). In addition, the STA may split an FFT of an L-SIG field (e.g., L-SIG field 206 or L-SIG field 306) and an FFT of an RL-SIG field (e.g., RL-SIG field 208 or RL-SIG field 308) into two groups for the first AP and the second AP. In such an embodiment, a first group may be represented by L-SIG_APi and a second group may be represented by RL-SIG_APi, such that APi represents the first AP or the second AP. In such an example, the STA may then calculate an L-SIG CFO of APi ($\Delta f_{L\text{-}SIG}$(APi)) according to (2). Furthermore, in such an example, the STA may calculate the CFO (ΔJ):

$$\Delta f = g(\Delta f_{L\text{-}STF} + \Delta f_{L\text{-}LTF}(APi), \Delta f_{L\text{-}STF} + \Delta f_{L\text{-}LTF} + \Delta f_{L\text{-}SIG}(APi)) \quad (3),$$

where g represents an average or a function to estimate a single value.

A functional block diagram that depicts estimating CFO in accordance with an embodiment of the invention is described in further detail with reference to FIG. 5.

Figure 5:
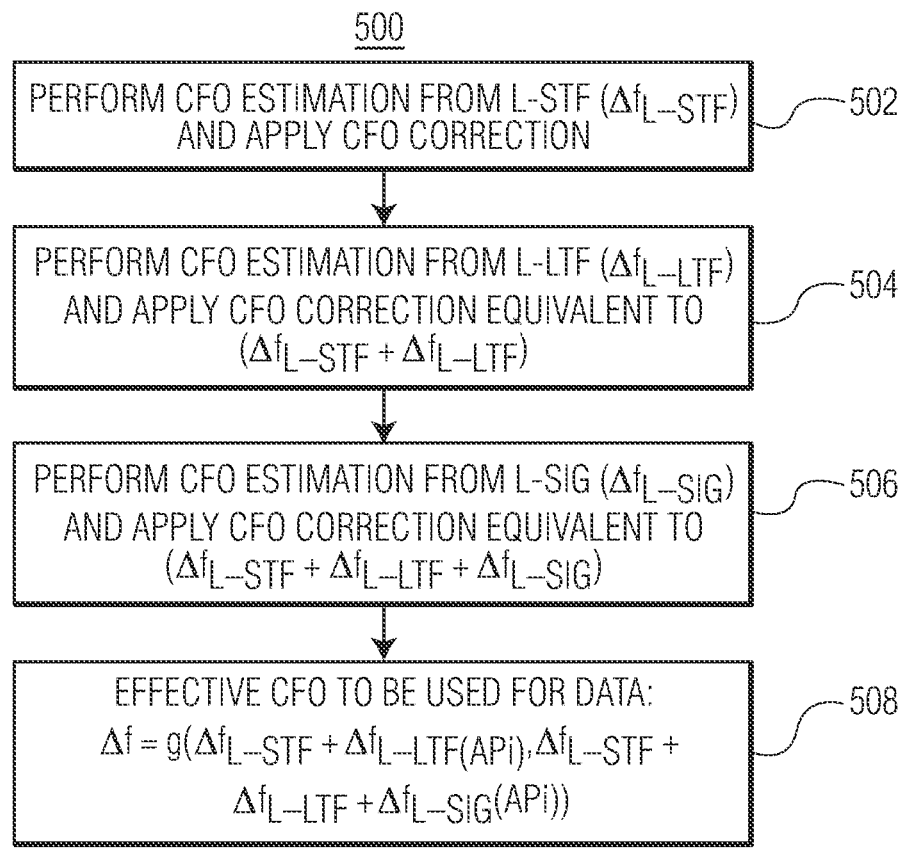
FIG. 5 depicts a functional block diagram of a technique for estimating Carrier Frequency Offset (CFO) at a station (STA) in accordance with an embodiment of the invention.

FIG. 5 depicts a functional block diagram, 500, of a technique for estimating CFO at an STA (e.g., STA 108) in accordance with an embodiment of the invention. At block 502, an STA may perform CFO estimation from an L-STF field (e.g., L-STF field 202 or L-STF field 302) to obtain L-STF CFO ($\Delta f_{L\text{-}STF}$) and apply CFO correction. At block 504, the STA may perform CFO estimation from an L-LTF field (e.g., L-LTF field 204 or L-LTF field 304) to obtain L-LTF CFO ($\Delta f_{L\text{-}LTF}$) and apply CFO correction equivalent to ($\Delta f_{L\text{-}STF} + \Delta f_{L\text{-}LTF}$), such that the L-LTF CFO ($\Delta f_{L\text{-}LTF}$) may be an average of ($\Delta f_{L\text{-}LTF}$ or a CFO estimation logic of a non-DMIMO packet reception. At block 506, the STA may perform CFO estimation from an L-SIG field (e.g., L-SIG field 206 or L-SIG field 306) to obtain L-SIG CFO ($\Delta f_{L\text{-}SIG}$) and apply CFO correction equivalent to ($\Delta f_{L\text{-}STF} + \Delta f_{L\text{-}LTF} + \Delta f_{L\text{-}SIG}$), such that the L-SIG CFO ($\Delta f_{L\text{-}SIG}$) may be an average of ($\Delta f_{L\text{-}SIG}$(APO) or a CFO estimation logic of a non-DMIMO packet reception. At block 508, the STA may calculate an effective CFO to be used for data, such that the effective CFO may be calculated according to (3). In some embodiments, ($\Delta f_{L\text{-}LTF}$) may be a single CFO estimate that may be calculated for a received packet and of ($\Delta f_{L\text{-}LTF}$(APi)) may be a CFO estimation that corresponds to APi and that uses a subcarrier set of $K_{APi}$. In some embodiments, ($\Delta f_{L\text{-}SIG}$) may be a single CFO estimate that may be calculated for a received packet and ($\Delta f_{L\text{-}SIG}$(APi)) may be a CFO estimation that corresponds to APi and that uses a subcarrier set of KAN.

With reference to FIG. 5, if an update in a receiver loop CFO may be applied between an L-LTF field (e.g., L-LTF field 204 or L-LTF field 304) and an L-SIG field (e.g., L-SIG field 206 or L-SIG field 306), then the update may need to be added to an L-SIG CFO estimate (e.g., L-SIG CFO ($\Delta f_{L\text{-}SIG}$)) to attain an effective CFO. Similarly, if a CFO may be applied in a receiver processing loop before the L-LTF field, then the CFO may need to be added to both an L-LTF CFO estimate (e.g., L-LTF CFO ($\Delta f_{L\text{-}LTF}$)) and the L-SIG CFO estimate (e.g., L-SIG CFO ($\Delta f_{L\text{-}SIG}$)) to attain the effective CFO.

In some embodiments, once the STA has an estimate CFO from a first AP and a second AP, the STA may transmit the estimated CFO to the first AP and the second AP via a control packet (e.g., an Acknowledgment (Ack) packet, an up-link (UL) packet, etc.) to improve CFO estimation over time. In such an embodiment, the first AP and the second AP may receive the control packet that includes the estimated CFO and may use a prediction algorithm to estimate a subsequent CFO for a subsequent packet. In some embodiments, the subsequent CFO may be corrected based on a predicted CFO value by the first AP and the second AP. In some embodiments, the first AP and the second AP may transmit the subsequent packet using the subsequent CFO. In some embodiments, the prediction algorithm may be based on a least square model, a linear model, a logistic regression, decision tree learning, and/or machine learning. As an example, a simple linear model may be:

$$cfo(n) = \sum_{i=1}^{i} cfo(n-i) \times \alpha_i + cfo_{fb}(n-1) \times \beta, \quad (4)$$

where cfo(n) may be used by an AP (e.g., the first AP or the second AP) for an $n^{th}$ packet starting from an initial packet, $cfo_{fb}(n-1)$ may be a CFO estimate from the STA, and $\alpha_i$'s and $\beta$ may be a co-efficient used.

In some embodiments, for wireless communication systems using the previously described technique(s), usage of a trigger frame before each down-link (DL) packet transmitted in accordance with a DMIMO transmission may be avoided. In some embodiments, using the previously described technique(s) to attain an estimate CFO may help improve a length of a packet without a reduction in performance. Thus, an effective spectral efficiency may be improved which helps further improve usage of DMIMO transmissions.

Figure 6:
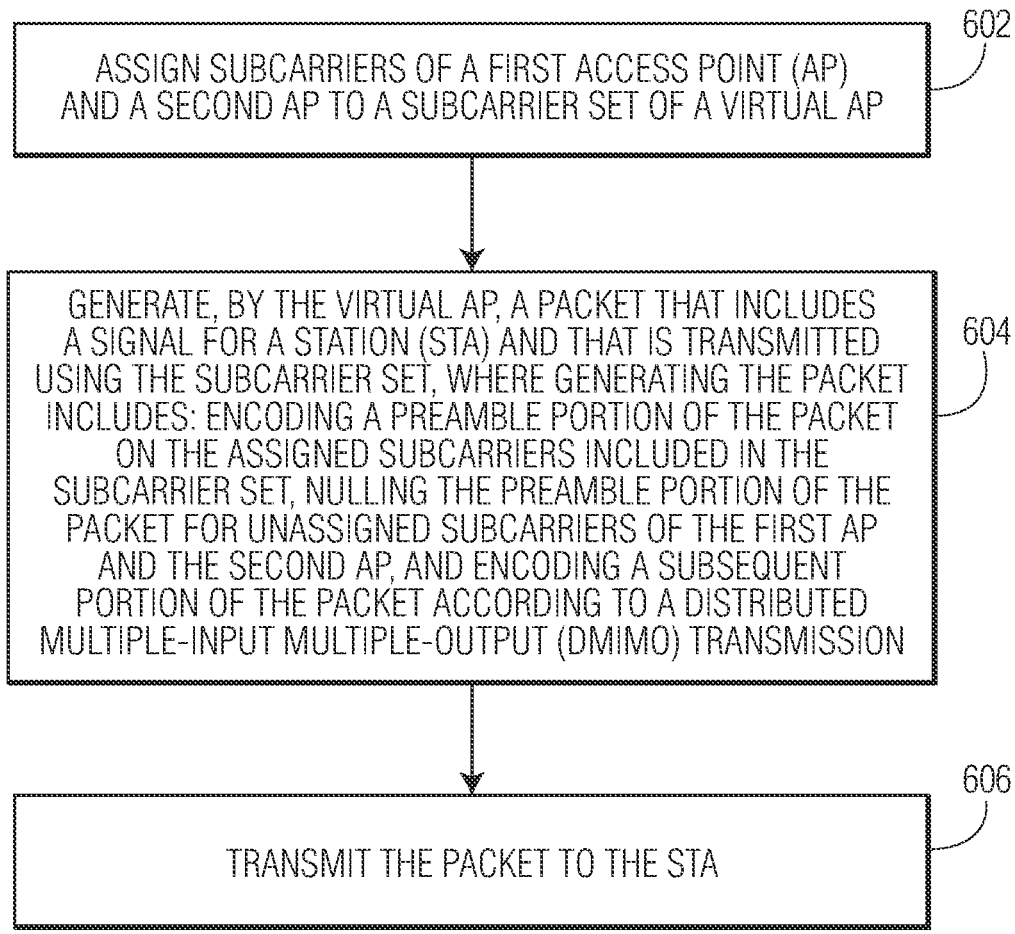
FIG. 6 illustrates a flow diagram of a technique for wireless communications in accordance with an embodiment of the invention.

FIG. 6 illustrates a flow diagram of a technique for wireless communications in accordance with an embodiment of the invention. At block 602, subcarriers of a first AP and a second AP may be assigned to a subcarrier set of a virtual AP. At block 604, the virtual AP may generate a packet that includes a signal for an STA and that is transmitted using the subcarrier set, where generating the packet includes: encoding a preamble portion of the packet on the assigned subcarriers included in the subcarrier set, nulling the preamble portion of the packet for unassigned subcarriers of the first AP and the second AP, and encoding a subsequent portion of the packet according to a DMIMO transmission. At block 606, the packet may be transmitted to the STA.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for wireless communications, the method comprising:
    assigning subcarriers of a first access point (AP) and a second AP to a subcarrier set of a virtual AP;
    generating, by the virtual AP, a packet that includes a signal for a station (STA) and that is transmitted using the subcarrier set, wherein generating the packet includes:
        encoding a preamble portion of the packet on the assigned subcarriers included in the subcarrier set;
        nulling the preamble portion of the packet for unassigned subcarriers of the first AP and the second AP; and
        encoding a subsequent portion of the packet according to a Distributed Multiple- Input Multiple-Output (DMIMO) transmission;
    transmitting the packet to the STA;
    receiving from the STA an estimated Carrier Frequency Offset (CFO) of the first AP and the second AP which is determined based on the signal, wherein the CFO of the first AP is determined based on an angle of a product of first tones of subcarriers in two different fields of the preamble portion received at the STA, the first tones corresponding to respective subcarriers assigned to the first AP, and the CFO of the second AP is determined by the STA based on an angle of a product of second tones of subcarriers in the two different fields, the second tones corresponding to respective subcarriers assigned to the second AP;
    estimating a subsequent CFO for a subsequent packet to be transmitted to the STA based on the estimated CFO; and
    transmitting the subsequent packet based on the subsequent CFO.

2. The method of claim 1, wherein the subcarrier set avoids signal overlap between the assigned subcarriers of the first AP and the second AP.

3. The method of claim 1, wherein the assigned subcarriers included in the subcarrier set are even subcarriers for the first AP and odd subcarriers of the second AP.

4. The method of claim 1, wherein the assigned subcarriers included in the subcarrier set are odd subcarriers of the first AP and even subcarriers of the second AP.

5. The method of claim 1, wherein the assigned subcarriers included in the subcarrier set are a first half of subcarriers included in each 20 MHz band for the first AP and a second half of subcarriers included in each 20 MHz band for the second AP.

6. The method of claim 1, wherein the assigned subcarriers included in the subcarrier set are a second half of subcarriers included in each 20 MHz band for the first AP and a first half of subcarriers included in each 20 MHz band for the second AP.

7. The method of claim 1, wherein the assigned subcarriers included in the subcarrier set are subcarriers included in a 20 MHz band and alternate between the first AP and the second AP with each 20 MHz band.

8. The method of claim 1, wherein the STA uses the signal transmitted using the subcarrier set to estimate the Carrier Frequency Offset (CFO) from the first AP and the second AP independently.

9. The method of claim 8, wherein the STA estimates the CFO from the first AP and the second AP by:
splitting a fast Fourier transform (FFT) of a Legacy Long Training Field-1 (L-LTF1) field and an FFT of a Legacy Long Training Field-2 (L-LTF2) field into two groups for the first AP and the second AP, wherein the L-LTF1 field and the L-LTF2 field are both included in a Legacy Long Training Field (L-LTF) field, and wherein a first group is represented by L-LTF1_APi and a second group is represented by L-LTF2_APi, and wherein APi represents at least one of the first AP and the second AP;
calculating the CFO of APi from the L-LTF field ($\Delta f_{LTF}$(APi)):

$$(\Delta f_{L-LTF}(APi)) = \sum_{k \in APi\,tones} \frac{\angle(L\text{-LTF1\_APi}(k)' \times L\text{-LTF2\_APi}(k))}{2\pi N},$$

wherein $\angle(x)$ represents an angle of x in radians, x' represents a conjugate of x, N represents an FFT size, and k represents the subcarrier set of APi.

10. The method of claim 8, wherein the STA estimates the CFO from the first AP and the second AP by:
splitting an FFT of a Legacy Signal (L-SIG) field and an FFT of a Repeated Legacy Signal (RL-SIG) field into two groups for the first AP and the second AP, wherein a first group is represented by L-SIG_APi and a second group is represented by RL-SIG_APi, and wherein APi represents at least one of the first AP and the second AP;
calculating the CFO of APi from the L-SIG field ($\Delta f_{LTF}$(APi)):

$$(\Delta f_{L-SIG}(APi)) = \sum_{k \in APi\,tones} \frac{\angle(L\text{-SIG\_APi}(k)' \times RL\text{-SIG\_APi}(k))}{2\pi N * 1.25},$$

wherein $\angle(x)$ represents an angle of x in radians, x' represents a conjugate of x, N represents an FFT size, and k represents the subcarrier set of APi.

11. The method of claim 8, wherein the STA estimates the CFO from the first AP and the second AP by:
splitting an FFT of an L-LTF1 field and an FFT of an L-LTF2 field into two groups for the first AP and the second AP, wherein the L-LTF1 field and the L-LTF2 field are both included in a L-LTF field, and wherein a first group is represented by L-LTF1_APi and a second group is represented by L-LTF2_APi, and wherein APi represents at least one of the first AP and the second AP;
calculating an L-LTF CFO of APi ($\Delta f_{LTF}$(APi)):

$$(\Delta f_{L-LTF}(APi)) = \sum_{k \in APi\,tones} \frac{\angle(L\text{-LTF1\_APi}(k)' \times L\text{-LTF2\_APi}(k))}{2\pi N},$$

wherein $\angle(x)$ represents an angle of x in radians, x' represents a conjugate of x, N represents an FFT size, and k represents the subcarrier set of APi;
splitting an FFT of L-SIG and an FFT of RL-SIG into two groups for the first AP and the second AP, wherein a first group is represented by L-SIG_APi and a second group is represented by RL-SIG_APi, and wherein APi represents at least one of the first AP and the second AP;
calculating an L-SIG CFO of ($\Delta f_{LTF}$(APi)):

$$(\Delta f_{L-SIG}(APi)) = \sum_{k \in APi\,tones} \frac{\angle(L\text{-SIG\_APi}(k)' \times RL\text{-SIG\_APi}(k))}{2\pi N * 1.25},$$

wherein $\angle(x)$ represents an angle of x in radians, x' represents a conjugate of x, N represents an FFT size, and k represents the subcarrier set of APi; and
calculating the CFO ($\Delta f$):

$$\Delta f = g(\Delta f_{L-STF} + \Delta f_{L-LTF}(APi), \Delta f_{hd\,L-STF} + \Delta f_{L-LTF} + \Delta f_{L-SIG}(APi)),$$

wherein g represents at least one of an average and a function to estimate a single value and wherein $\Delta f_{L-sTF}$ is the CFO of a Legacy Short Training Field.

wherein g represents at least one of an average and a function to estimate a single value.

12. The method of claim 8, wherein the STA transmits the estimated CFO to the first AP and the second AP via a control packet.

13. The method of claim 12, wherein the first AP and the second AP receive the control packet that includes the estimated CFO and use a prediction algorithm to estimate the subsequent CFO for the subsequent packet.

14. The method of claim 13, wherein the subsequent CFO is corrected based on a predicted CFO value by the first AP and the second AP.

15. The method of claim 13, wherein the first AP and the second AP transmit the subsequent packet using the subsequent CFO.

16. The method of claim 13, wherein the prediction algorithm is based on at least one of a least square model, a linear model, a logistic regression, decision tree learning, and machine learning.

17. The method of claim 13, wherein the prediction algorithm is a simple linear model according to:

$$cfo(n) = \sum_{i=1}^{l} cfo(n-i) \times \alpha_i + cfo_{fb}(n-1) \times \beta$$

wherein, cfo(n) is used by at least one of the first AP and the second AP for an $n^{th}$ packet starting from an initial packet, cfo$_{fb(n-}$1) is a CFO estimate from the STA, and $\alpha_i$'s and $\beta$ are a co-efficient used.

18. The method of claim 1, wherein nulling the preamble portion of the packet includes encoding zeros for the unassigned subcarriers.

19. The method of claim 1, wherein transmitting the packet to the STA avoids usage of a trigger frame before each down-link (DL) packet transmitted in accordance with the DMIMO transmission.

20. The method of claim 1, wherein the subsequent CFO is based on a CFO used by the first AP or second AP and the estimated CFO received from the STA.

21. A virtual access point (AP), the virtual AP comprising:
a processor configured to:
assign subcarriers of a first AP and a second AP to a subcarrier set of the virtual AP;
generate a packet that includes a signal for a station (STA) and that is transmitted using the subcarrier set, wherein generation of the packet includes:

encoding a preamble portion of the packet on the assigned subcarriers included in the subcarrier set;

nulling the preamble portion of the packet for unassigned subcarriers of the first AP and the second AP;

encoding a subsequent portion of the packet according to a Distributed Multiple-Input Multiple-Output (DMIMO) transmission; and nulling the preamble portion of the packet for unassigned subcarriers of the first AP and the second AP; and encoding a subsequent portion of the packet according to a Distributed Multiple-Input Multiple-Output (DMIMO) transmission; transmit the packet to the STA;

receive from the STA an estimated Carrier Frequency Offset (CFO) of the first AP and the second AP which is determined based on the packet, wherein the CFO of the first AP is determined based on an angle of a product of first tones of subcarriers in two different fields of the preamble portion received at the STA, the first tones corresponding to respective subcarriers assigned to the first AP, and the CFO of the second AP is determined by the STA based on an angle of a product of second tones of subcarriers in the two different fields, the second tones corresponding to respective subcarriers assigned to the second AP;

estimate a subsequent CFO for a subsequent packet to be transmitted to the STA based on the estimated CFO; and transmit the subsequent packet based on the subsequent CFO.

22. The virtual AP of claim 21, wherein the subsequent CFO is based on a CFO used by the first AP or second AP and the estimated CFO received from the STA.

* * * * *